United States Patent [19]
Jackson

[11] 4,345,468
[45] Aug. 24, 1982

[54] LIQUID SIGHT MONITOR

[75] Inventor: William A. Jackson, Houston, Tex.

[73] Assignee: Jogler, Inc., Houston, Tex.

[21] Appl. No.: 189,862

[22] Filed: Oct. 7, 1980

[51] Int. Cl.³ .............................................. G01F 23/02
[52] U.S. Cl. ........................................ 73/326; 62/85; 73/329
[58] Field of Search ................. 73/323, 325, 326, 328, 73/331, 329; 220/82 A; 285/133 R

[56] References Cited
U.S. PATENT DOCUMENTS

| | | | |
|---|---|---|---|
| 15,617 | 8/1856 | Paige | 73/326 X |
| 17,472 | 6/1857 | Rugg | 73/328 |
| 333,046 | 12/1885 | Young | 73/326 |
| 479,235 | 7/1892 | Woods | 73/326 X |
| 483,485 | 9/1892 | Pinel | 73/326 |
| 502,073 | 7/1893 | Hausman | 73/323 |
| 924,050 | 6/1909 | Fay | 73/326 |
| 1,021,255 | 3/1912 | McCoy | 73/326 |
| 1,032,766 | 7/1912 | Paul | 73/326 |
| 1,164,484 | 12/1915 | Ernst | 73/326 |
| 1,702,447 | 2/1929 | McBrayer | 73/325 |
| 2,119,009 | 5/1938 | Elias | 73/323 |
| 2,161,849 | 6/1939 | Bordo | 73/326 |
| 2,260,144 | 11/1953 | Newcum | 73/326 |
| 2,554,100 | 5/1951 | Facchini | 73/323 |
| 2,629,262 | 2/1953 | Vilter | 73/326 |
| 2,829,909 | 4/1958 | Magnani | 285/95 |
| 3,066,530 | 12/1962 | Stenberg | 73/203 |
| 3,358,510 | 12/1967 | Hoffmann et al. | 73/329 |
| 3,381,976 | 5/1968 | Goodson et al. | 285/18 |
| 3,490,284 | 1/1970 | Engelhardt | 73/861.55 |
| 3,678,810 | 7/1972 | Holmes et al. | 285/133 R X |
| 3,751,971 | 8/1973 | Wilcox | 73/861.55 X |
| 3,886,796 | 6/1975 | Gruett | 73/328 |
| 4,018,215 | 4/1977 | Pei | 285/133 R |

*Primary Examiner*—Daniel M. Yasich
*Attorney, Agent, or Firm*—Frank S. Vaden, III; Emil J. Bednar

[57] ABSTRACT

A liquid sight monitor including an internal sight tube surrounded by an external sight tube, the ends therebetween being spaced apart by inserts including "O" rings sealing against both tubes. The internal annulus between the tubes can be environmentally purged. A protective shield can be provided, which also provides mounting flanges for supporting the overall apparatus in position for metering the system.

10 Claims, 6 Drawing Figures

LIQUID SIGHT MONITOR

BACKGROUND OF THE INVENTION

1. Field of the Invention

This invention pertains to a liquid sight monitor for monitoring the presence of a liquid system and more particularly to such a monitor that can be utilized in adverse climate conditions.

2. Description of the Prior Art

Liquid sight monitors can generally be categorized as either liquid level gauges or as sight flow indicators. Liquid level gauges typically employ a transparent tube and are connected externally to a tank or other vessel, both stationary and transportable, usually metal, but in all events to a vessel having opaque side walls, such gauge providing means to meter or measure the level of the liquid in the tank. A tank depth of 25 feet or less can be passively monitored utilizing a vertical tubular element of transparent material connected by bypass connections to valve connections extending from the tank. Such a tube provides ready observance of the level of the liquid within the tank without having to employ a dip stick, internal reading to a line or the like. Deeper tanks can be similarly monitored using a series of tubes.

Sight flow indicators are generally used for the purpose of revealing to the observer if liquid is present and flowing in an opaque pipeline or conduit. Coincidentally, if the line is flowing at less than full capacity, the actual flow rate can also be observed. A sight flow indicator, like a liquid level gauge, is usually connected into the system which it monitors by way of a bypass connection.

So as to provide protection for the glass or plastic tubing used as the transparent element in which the monitored liquid is located and through which the liquid is observed, it is common to use tubing of short lengths, and therefore not as susceptible to breakage as longer tubing lengths, and/or to shield such tubes with a metallic shield having only a small slot therein to observe the liquid in the tube.

Under favorable environmental or climatical conditions, prior art monitors are generally acceptable. However, under unfavorable temperature and humidity conditions, there are problems. Frost conditions on the outside of a tank can cover up the monitor element and ice can even form from the frost. If the inside liquid is warm and the outside temperature is cold, the plastic or glass can crack, break or discolor in use. Similar unfavorable events can occur where the outside conditions are extremely hot and/or humid. The monitor or sight element can sweat and fog up and if the temperatures are extreme, the element could crack and break through expansion.

To correct for the cold environmental effects that are adverse to normal operations, a steam line has been employed in the prior art adjoining the sight element to keep the glass clear of frost. This technique even works for hot environmental operating conditions to minimize fog condensations.

It can be recognized, however, that a steam line can be expensive and could itself have maintenance problems attendant to leaks and the like. Moreover, the steam line itself may deteriorate or crack the sight element because of the high temeprature environment it itself induces.

Double glass tube structures have been employed in the prior art, but such tubes have not employed insert ends, such as used herein, which seal against both the inside and outside tube by resilient means, thereby providing cushioning to both tubes, and which further provide the capacity to fit connections over a range of sizes and to expand and contract without adverse effect on the tubes. Prior art double tubes, on the other hand, have been contiguous, designed for double flow passage or end connected to each other so as not to achieve the benefits of the inserts herein provided.

Therefore, it is a feature of the present invention to provide an improved, completely passive, liquid sight monitor for presenting a clear sight element even in adverse environmental conditions.

It is another feature of the present invention to provide an improved liquid sight monitor by providing a double tube sight element, the annulus between the tubes being environmentally spaced apart and sealed, while allowing accommodation to connectors over a small range of lengths and to permit expansion/contraction of the tubes over a range.

It is still another feature of the present invention to provide an improved, double tube, liquid sight monitor, the annulus therebetween being capable of being purged and sealed to isolate the environment from the internal tube.

SUMMARY OF THE INVENTION

The liquid sight monitor herein disclosed includes a double tube sight element. The internal element is connected to the liquid system being monitored and is sufficiently transparent so as to reveal the presence of liquid. The external tube is spaced apart by inserts located at either end of the tubes and is also transparent or nearly so for permitting the liquid to be observed in the internal tube. The end inserts each are grooved and include an "O" ring in each groove to provide sealing against the surfaces of both the internal and external tubes. A slotted metallic or other hard protective shield, preferably with mounting flanges, are connected over the entire sight assembly. The end inserts are preferably flanged to provide mounting in appropriate recesses in the flanges of the shield. Splicers similar to the end inserts, but without flanges, can be used to join multiple sections of internal and external tubes.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only preferred embodiments of the invention and are therefore not to be considered limiting of its scope, for the invention may admit to other equally effective embodiments.

IN THE DRAWINGS

Figure 1:
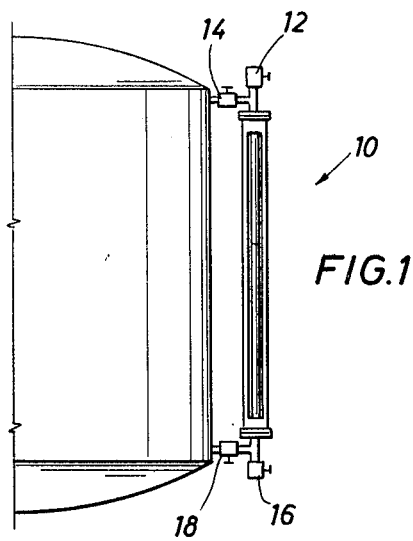

FIG. 1 is a partial elevation view of a preferred embodiment of the present invention shown in a typical position of use.

Figure 2:
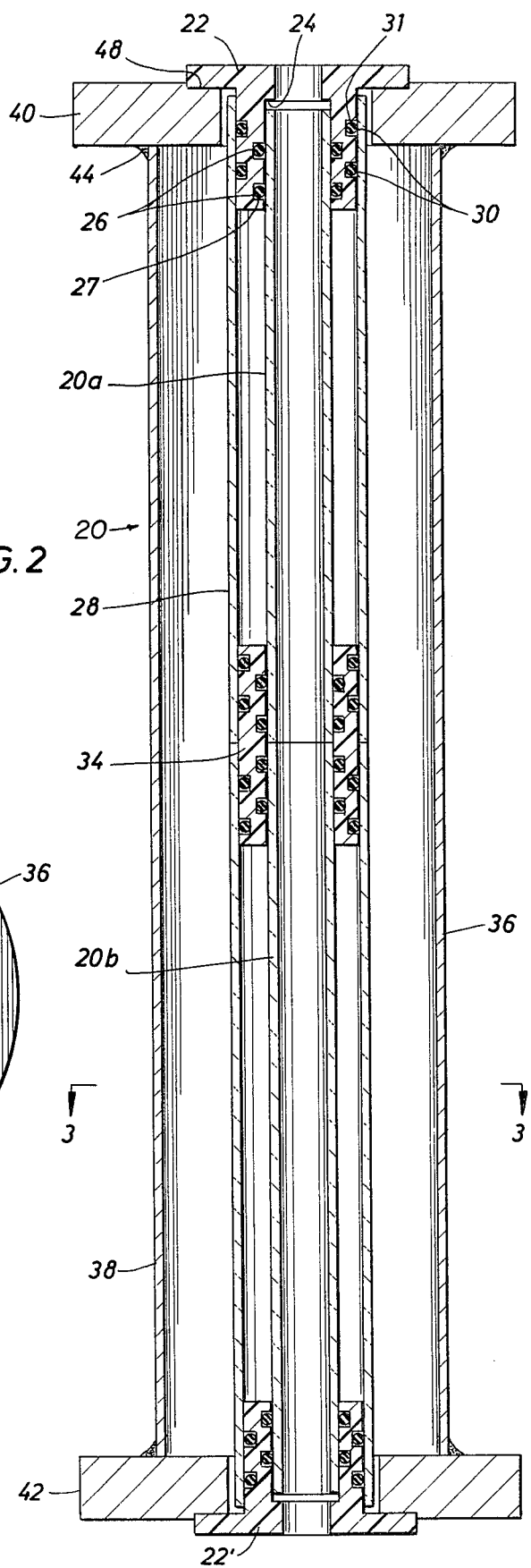

FIG. 2 is a vertical cross section of a liquid level gauge in accordance with a preferred embodiment of the present invention.

Figure 3:
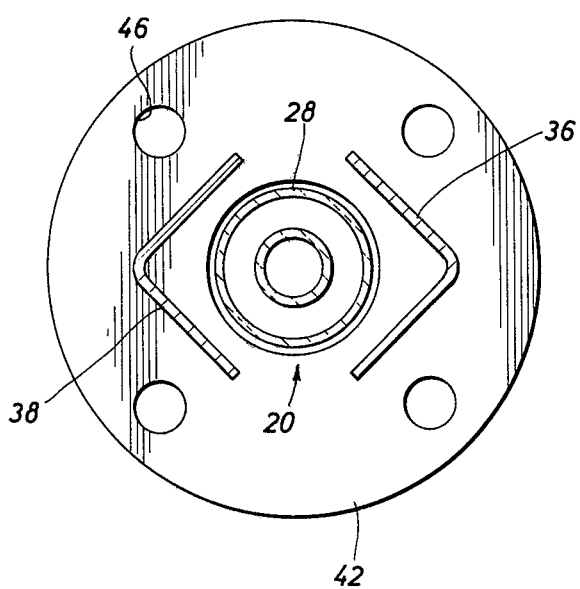

FIG. 3 is a cross sectional view of the present invention taken at line 3—3 of FIG. 2.

Figure 4:
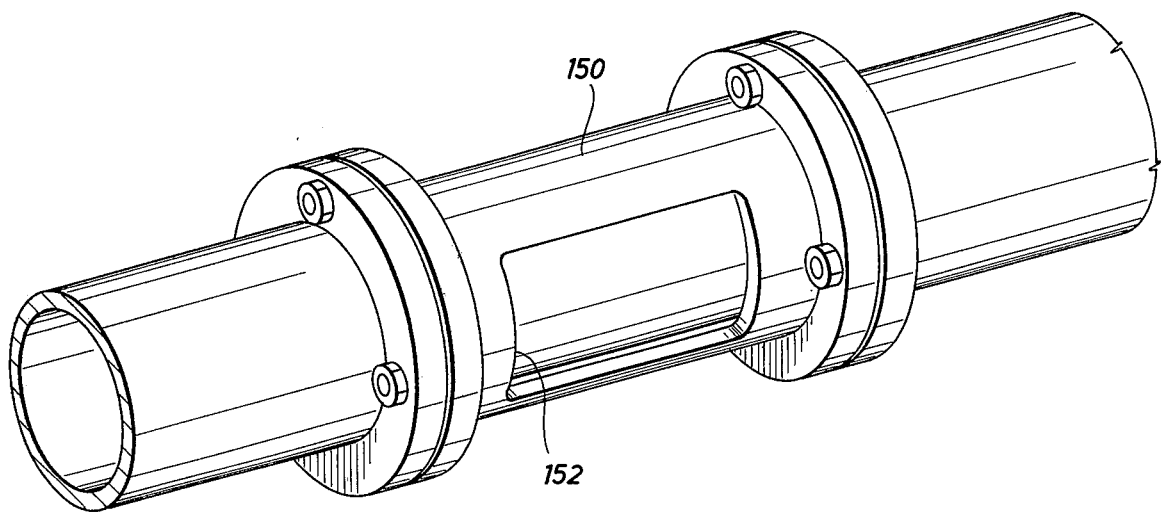

FIG. 4 is a pictorial view of a sight flow indicator in accordance with the present invention.

Figure 5:
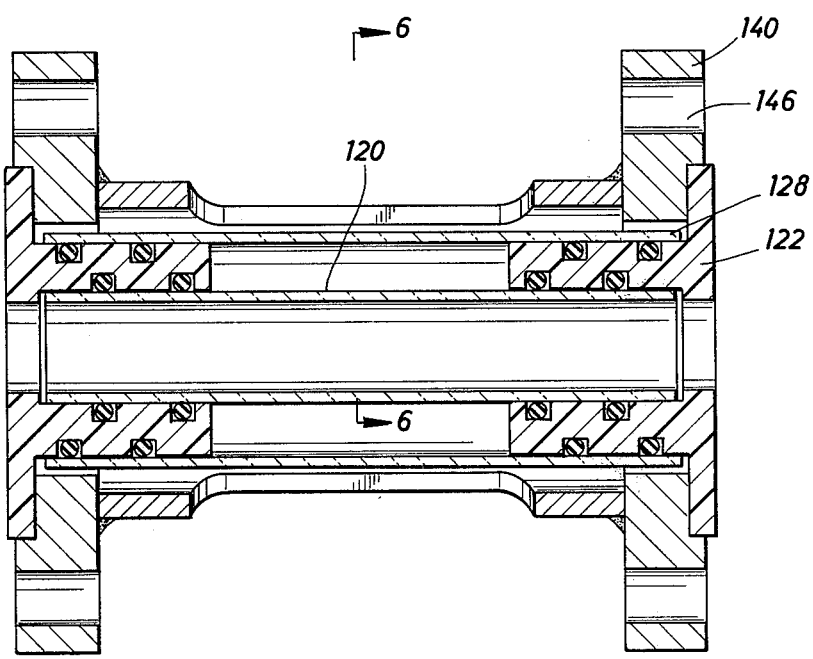

FIG. 5 is a longitudinal cross section of the sight flow indicator shown in FIG. 4.

Figure 6:
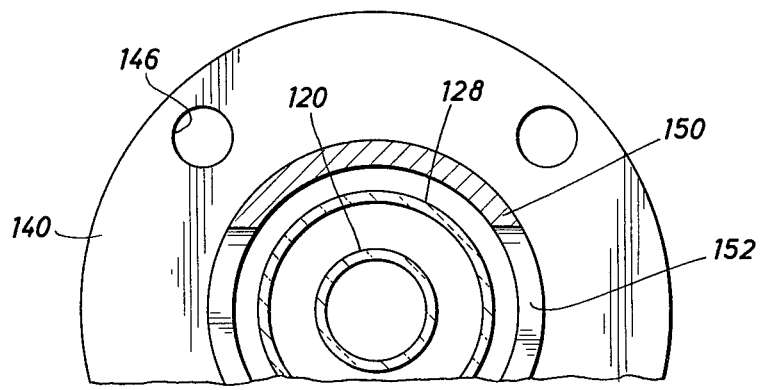

FIG. 6 is a cross sectional view taken at line 6—6 shown in FIG. 5.

DESCRIPTION OF THE PREFERRED EMBODIMENTS

Now referring to the drawings and first to FIG. 1, a liquid sight monitor in the form of a liquid level gauge 10 is shown pictorially in a typical position of use in connection with a tank. Such tank may be in a fixed installation or in a transportable mode. The liquid level gauge is connected top and bottom to a tank via typical valving 12 and 14 at the top of the gauge and valving 16 and 18 at the bottom of the gauge. As indicated above, a single liquid level gauge length can be up to about 25 feet in a typical installation, although staggered arrangements can be provided using more than one gauge for tanks which are deeper than 25 feet.

As shown in FIG. 2, a single two-sight element 20 provides the internal element of the arrangement for accommodating the liquid to be monitored. Although there will be many, possibly the majority of instances where the internal tube sight will be a single elongate piece of clear plastic, glass or otherwise, it can comprise an end-to-end element arrangement comprising shorter piece 20a and lower piece 20b.

Located at the upper end of the tubesight element a flanged insert 22 is pressed over the end of the tube in those sealing engagement with the surface of the tube. The insert may be made of Teflon (TFE) or similar material and has a shoulder 24 against which the end of the tube abuts. Adjacent the surface of the tube are two grooves 26. An "O" ring 27 of VitonA, polypropylene, Teflon, or other similar plastic material may be used in each of the grooves 26 to form the sealing engagement.

A second tubing 28 concentrically surrounds tube 20 and is spaced apart at either end by the dimension of insert 22, which fits snuggly between the surfaces of tube 20 and 28. Insert 22 includes external grooves 30 interspersed between grooves 26 and positioned against the surface of tube 28, each groove accommodating an "O" ring 31.

The lower end of the level gauge is similarly arranged with insert 22' sealing against both tube 20 and 28 in a similar fashion to that which has just been described for insert 22.

When two end-to-end sections of tube 20 are employed, a splicer 34 can be used, each splicer having grooves and "O" rings sealed against tube 20a and 20b on the inside and on the outside against the inside surface of tube 28. The sealing is in the same fashion as with inserts 22 and 22'. An armored shield, normally carbon steel, aluminum, stainless steel or the like is used to protect the double sight tube arrangement which has just been described, as best seen in FIG. 3. The armored shield comprises two V-shaped brackets 36 and 38 around the double site arrangement and leaving an opening at least on one side between the brackets. Brackets 36 and 38 are connected into end flanges 40 and 42 such as by welds 44. Each of the flanges are bored with mounting holes 46 for attachment to a mating flange to connect the level gauge just described to the system for monitoring. The external end of flange 40 includes a recess 48 for accommodating the flanged ends of the insert 22 or 22'.

Now referring to FIG. 4, a sight flow indicator embodiment of the liquid sight monitor is shown. A sight flow indicator is normally aligned horizontally as shown in FIG. 4 and comprises many of the same elements as described for a level gauge. Internal tube 120 is sealed at its ends against inserts 122, employing a groove and "O" ring arrangement similar to that which has been described. An external tube 128 is sealed against the external surface of the inserts by a groove and "O" ring arrangement also in a similar arrangement to that which has been described. A protective shield, which in this case is tubular with an opening 150, is concentric with the double tube arrangement which has just been described. The opening permits viewing of the liquid flow through the internal tube. The shield is welded or otherwise connected to a flange 140 appropriately bored at 146 for mounting to an adjacent flange of a pipe in the monitored system, as shown in FIG. 4.

The annulus between the tube surfaces can be connected to a connection (not shown) for purposes of evacuating the annulus therebetween or purging the annulus with carbon dioxide, nitrogen or other inert gas. The connection may be through the end, such tube(s) for this purpose being through an end insert, or may be transverse to the external tube surface. If the connection is transverse, it must be sealed off on the side by appropriate means.

While particular embodiments of the invention have been shown and described, it will be understood that the invention is not limited thereto since many modifications may be made and will become apparent to those skilled in the art. For example, the materials which may be used are not critical to the invention. The sight tubes, for example may be Pyrex, Borosilicate or the like. It has already been mentioned that the inserts and "O" rings may be a number of different types of materials. The protective shields and flanges, although normally of carbon steel, may even be plastic or exotic materials if the particular installation deems such materials necessary.

What is claimed is:

1. A liquid sight monitor for monitoring liquid presence of a liquid system connected thereto, comprising
    an internal tube adaptable for connection to the liquid system and insufficiently transparent to reveal the presence of liquid in the tube,
    an external tube surrounding said internal tube and sufficiently transparent to reveal the presence of liquid in said internal tube, and
    plural means for spacing apart the external surface of said internal tube from the internal surface of said external tube including
    first seal means in at least one first grooved surface of said plural spacing apart means for sealing against the internal surface of said external tube, and
    second seal means in at least one grooved surface of said plural spacing apart means for sealing against the external surface of said internal tube.

2. A liquid sight monitor in accordance with claim 1, wherein said end plural means includes
    an annular insert snuggly fitting between the internal surface of said external tube and the external surface of said internal tube,
    the external surface of said insert against said internal surface of said external tube including at least one annular groove, the internal surface of said insert against said external surface of said internal tube including at least one annular groove, a first "O" ring inserted in each of said annular grooves in the external surface of said insert, and a second "O" ring inserted in each of said annular grooves in the internal surface of said insert.

3. A liquid sight monitor in accordance with claim 2, wherein said end plural means annular insert extends beyond the end of said tubes for purposes of fitting over an externally projecting tube from the monitored liquid system.

4. A liquid sight monitor in accordance with claim 2, and including a protecting shield about said external tube having at least one slot therein to provide visual monitoring of said tubes.

5. A liquid sight monitor in accordance with claim 4, wherein said protecting shield includes a mounting flange, said mounting flange including a recess in its external surface, and wherein said insert includes an annular flange accommodated by said shield flange recess.

6. A liquid sight monitor in accordance with claim 2, and including an annular splicer for joining end-to-end sections of internal and external tubes, said splicer snugly fitting against the external surface of a first and second section of said internal tube and against the internal surface of a first and second section of said external tube, the internal surface of said splicer including at least two annular grooves, one adjacent each said first and second sections of said internal tube, the external surface of said splicer including at least two annular grooves, one adjacent each said first and second sections of said external tube, and an "O" ring inserted in each of said annular grooves of said splicer.

7. A liquid sight monitor in accordance with claim 1, wherein said internal tube is glass and said external tube is plastic.

8. Method of providing a liquid sight monitor for monitoring liquid presence in a liquid system connected thereto, comprising the steps of providing an internal tube connected to the liquid system and sufficiently transparent to reveal the presence of liquid in the tube, providing an external tube surrounding said internal tube and sufficiently transparent to reveal the presence of liquid in said internal tube, spacing apart and sealing said internal tube and said external tube by a plural insert means having at least one means for sealing in a first grooved surface, purging the space between said internal and external tube to remove substantially all of the moisture therefrom, and spacing apart and sealing said internal tube and said external tube by a second plural insert means having at least one means for sealing in a second grooved surface.

9. The method in accordance with claim 8, wherein said purging is by application of an inert gas to said space.

10. The method in accordance with claim 8, wherein said purging is by drawing at least a partial vacuum on said space.

* * * * *

UNITED STATES PATENT AND TRADEMARK OFFICE
CERTIFICATE OF CORRECTION

PATENT NO. : 4,345,468
DATED : August 24, 1982
INVENTOR(S) : William A. Jackson

It is certified that error appears in the above-identified patent and that said Letters Patent are hereby corrected as shown below:

Column 4, line 62, "wherein said end plural means includes" should read -- wherein said plural means includes --.

Column 5, line 10, "wherein said end plural means annular insert extends" should read -- wherein said plural means annular insert extends --.

Signed and Sealed this

First Day of March 1983

[SEAL]

Attest:

GERALD J. MOSSINGHOFF

*Attesting Officer*     *Commissioner of Patents and Trademarks*